United States Patent [19]

Kagimasa et al.

[11] Patent Number: 4,851,989
[45] Date of Patent: Jul. 25, 1989

[54] DATA PROCESSING APPARATUS WITH A VIRTUAL STORAGE ADDRESS BOUNDARY CHECK CIRCUIT

[75] Inventors: Toyohiko Kagimasa; Kikuo Takahashi, both of Hachioji, Japan; Yoshie Ono, Burlingame, Calif.; Seiichi Yoshizumi, Hino, Japan

[73] Assignee: Hitachi, Ltd., Tokyo, Japan

[21] Appl. No.: 897,403

[22] Filed: Aug. 18, 1986

[30] Foreign Application Priority Data

Sep. 6, 1985 [JP] Japan ............................... 60-195842

[51] Int. Cl.[4] ...................... G06F 11/00; G06F 12/10
[52] U.S. Cl. .................................. 364/200; 364/246.7; 364/256.4; 364/255.7
[58] Field of Search ... 364/200 MS File, 900 MS File

[56] References Cited

U.S. PATENT DOCUMENTS

| | | | |
|---|---|---|---|
| 4,084,227 | 4/1978 | Bennett et al. | 364/200 |
| 4,177,510 | 12/1979 | Appell et al. | 364/200 |
| 4,408,274 | 10/1983 | Wheatley et al. | 364/200 |
| 4,584,666 | 4/1986 | Zolnowsky et al. | 364/900 |

Primary Examiner—Thomas M. Heckler
Assistant Examiner—Christine M. Eakner
Attorney, Agent, or Firm—Antonelli, Terry & Wands

[57] ABSTRACT

A data processing apparatus for an address boundary check circuit employed in combination with a virtual storage comprises a segment table register provided in association with an address translation table for storing an area discriminating signal indicating whether data to be checked in respect to the address boundary is assigned to unit areas resulting from division of the virtual storage and holding a limit address signal indicating the extent of the area assigned to data which requires an address boundary check of a virtual address accessing the data when the data is found in that area, a register holding a virtual base address for storing a register discriminating signal indicating whether or not the base address is for data to be checked in respect to the address boundary, and an address boundary check circuitry for deciding on the basis of the aforementioned first to third signals whether or not a virtual address calculated in response to an instruction erroneously goes beyond the address boundary.

14 Claims, 6 Drawing Sheets

DATA PROCESSING APPARATUS WITH A VIRTUAL STORAGE ADDRESS BOUNDARY CHECK CIRCUIT

BACKGROUND OF THE INVENTION

1. Field of the Invention

The present invention relates to a storage protecting apparatus suited advantageously for protecting a main storage of a computer system.

2. Description of the Prior Art

As to the use of a virtual storage in a conventional computer, two methods in general have been known. They are a demand paging method and a segmentation method. For particulars of these methods, detailed discussion will be found in a publication titled "Operating System" by Stuart E. Madnik and John J. Donovan published by McGraw-Hill Company in 1974.

According to the demand paging method, the virtual storage can be effectively allocated to a plurality of data groups or sets without waste. However, with the demand paging method, it is impossible to check in a facilitated manner whether a virtual address of an operand designated by an instruction commanding access to a given data set goes beyond the area allocated to that given data set (this function is referred to as the address boundary check). Thus, the demand paging method suffers a shortcoming in that protection of other data against destruction due to program error can not be readily ensured. On the other hand, the segmentation method with which the address boundary check can be easily effectuated is attended with a problem that a certain part of the virtual storage can not be made use of, thus degrading utilization efficiency of the virtual memory.

SUMMARY OF THE INVENTION

Accordingly, it is an object of the present invention to provide a data processing apparatus which allows a virtual storage to be used very effectively and which is capable of performing an address boundary check.

In view of the above and other objects which will become apparent as description proceeds, there is provided according to a general aspect of the present invention a data processing apparatus for an address boundary check circuit employed in combination with a virtual storage which apparatus comprises means provided in association with an address translation table for storing a first signal or area discriminating signal (P) indicating whether data to undergo the address boundary check is assigned to unit areas (hereinafter referred to as segments) resulting from division of the virtual storage, a second signal or limit address signal (UA) indicating the extent of the area assigned to the data to undergo the address boundary check when the data is found in that area; means provided in association with a register holding a virtual base address for storing a third signal register discriminating signal (L) indicating whether the base address is for the data to undergo the address boundary check; and address boundary check means for deciding whether a virtual address determined through calculation in response to an instruction erroneously goes beyond the address boundary on the basis of the aforementioned first to third signals and the virtual address.

With the arrangement of the invention described above, the virtual address as calculated is decided to be erroneous when the third signal (L) associated with the base register designated by the instruction indicates that the base address held in the register is for the data to undergo the address boundary check while the calculated virtual address is not for the area allocated to that data or alternatively when the third signal (L) indicates that the base address of the base address register is not for the data not to undergo the address boundary check while the calculated virtual address belongs to the segment allocated to the data to undergo the address boundary check and lies within the area allocated to the data to undergo the address boundary check.

The above and other objects, features and advantages of the present invention will become more apparent for those skilled in the art upon reading the following detailed description taken in conjunction with the accompanying drawings which show an illustrative embodiment of the invention.

DESCRIPTION OF THE PREFERRED EMBODIMENTS

For having a better understanding of the invention, description will first be made of the hitherto known relevant techniques and the problems thereof in more detail.

Figure 4:
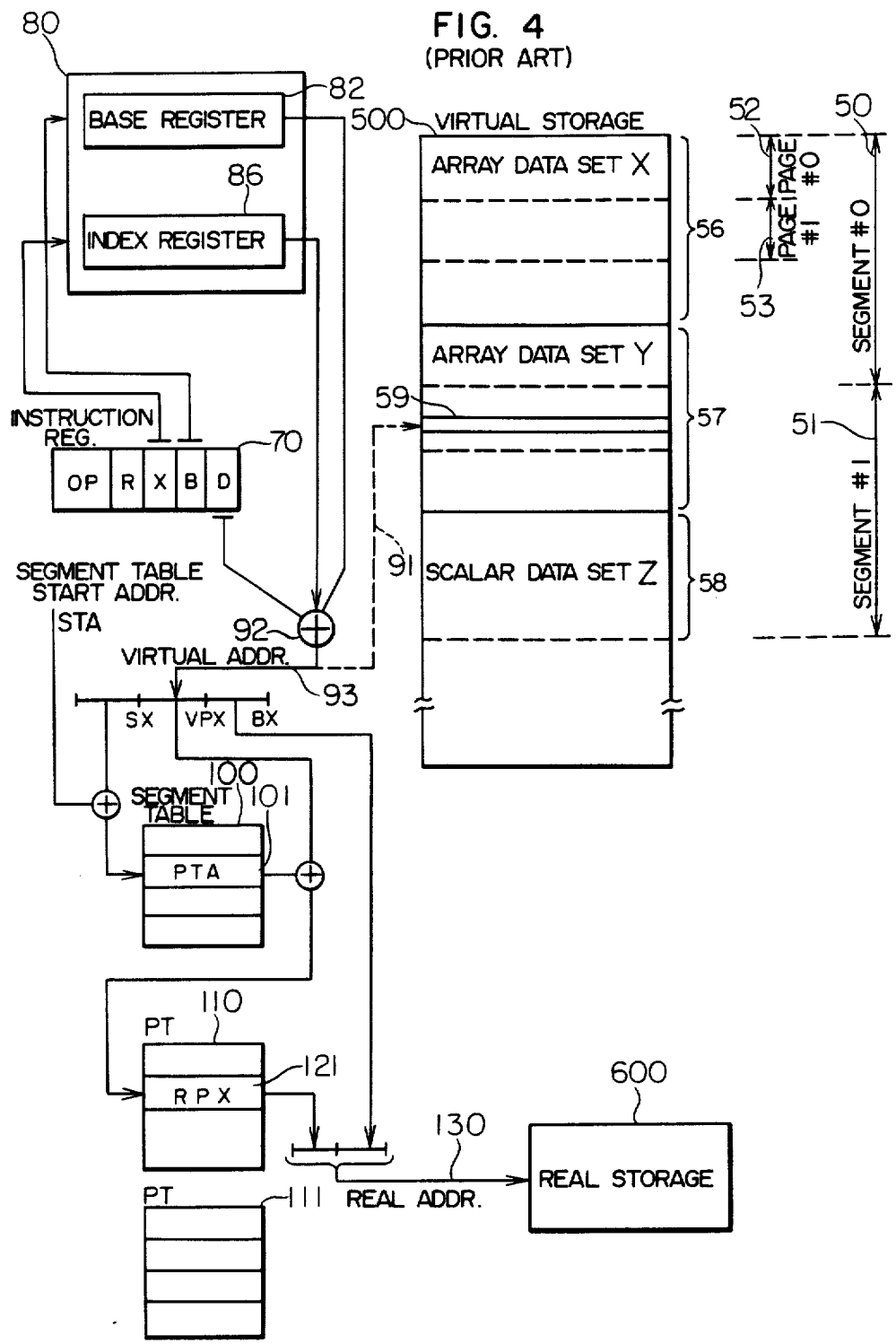
FIG. 4 is a view for illustrating a hitherto known demand paging method.

In the first place, the demand paging method will be elucidated by referring to FIG. 4. According to the demand paging method, a virtual storage 500 is divided into unit areas (referred to as segment) 50, 51 and so forth each having a fixed length, which segment in turn is divided into unit regions 52, 53 and so forth, which region is referred to as a page and has a fixed length. A user or operator can designate areas 56, 57, 58 and/or others for use for a number of data sets such as, for example, array data sets X and Y and a scalar data set Z. In that case, these areas may extend over different segments. This is one of the characteristic features of the demand paging method.

An instruction 70 includes identification numbers B and X of a base register 82 and an index register 86, respectively, in a group of general purpose registers 80 and displacement D for the purpose of designating an operand (storage operand) to be read out from a real storage 600 in addition to an operand code OP and an identification number R for designating one of the general purpose registers 80 into which the operand is to be read. In this connection, the content of the base register 82 designated by the instruction is referred to as the base address and the content of the index register 86 designated by the instruction is termed as the relative address. Data 93 resulting from the addition of the base address, the relative address and the displacement D which is a second relative address through an adder 92 represents a virtual address of an area 59 for the operand to which access is to be made, as indicated by an arrow 91. Translation of the virtual address 93 into a corresponding real address 130 is carried out with the aid of an address translation table composed of a segment table ST) 100 and a plurality of page tables (PT) 110, 111 and so forth provided separately for the segments, respectively. Each of the page tables 110, 111 and so forth contains entries indicative of real page addresses PA assigned to the pages in each relevant segment, respectively. On the other hand, the segment table 100 contains entries indicating the start addresses of the page tables for the pages in each of the segments. The virtual address 93 calculated in the manner described above is divided into three fields consisting of a segment index field SX for designating one segment, a page index field VPX for designating one page in the designated segment and a byte index field BX for designating one byte position or location on the designated page, as seen in the direction from the significant side.

Upon address translation, a segment index SX and a predetermined start address STA of the segment table 100 are added together to determine the start address PTA of the relevant page table by referring to the entry such as, for example, entry 101 of the segment table 100. Then, the start address PTA is added to the page table index VPX to determine the real page index RPX by referring to the entry such as, for example, entry 121 of the page table (e.g. the page table 110) indicated by the address determined through the aforementioned addition. Subsequently, the byte index BX is merged into the real page index RPX to create the real address 130 of the operand. According to the demand paging method, the storage areas 56, 57, 58 and so forth of the virtual storage 500 can be allocated sequentially to structured data such as array data (e.g. A(1), A(2) and so forth) and non-structured data or scalar data such as integer data starting from the start address of the virtual storage 500 regardless of the segment boundaries. Consequently, it is possible that no area will remain unused among those provided, ensuring high-efficiency utilization of the virtual storage. It is however noted that the detection as to whether the virtual storage address designated by an instruction commanding the access, for example, to the area 57 for the array data set Y is erroneously located in the other area than the area 57 (this detection is referred to as the address boundary check) can not be carried out upon address translation. Accordingly, in order to effectuate this kind of check, it becomes necessary to adopt a method in which an instruction string prepared for the address boundary check is executed immediately in precedence to the instruction commanding the access to the virtual storage, which however means that the number of instructions to be executed is increased, involving reduction in the processing speed, to a disadvantage.

Figure 5:
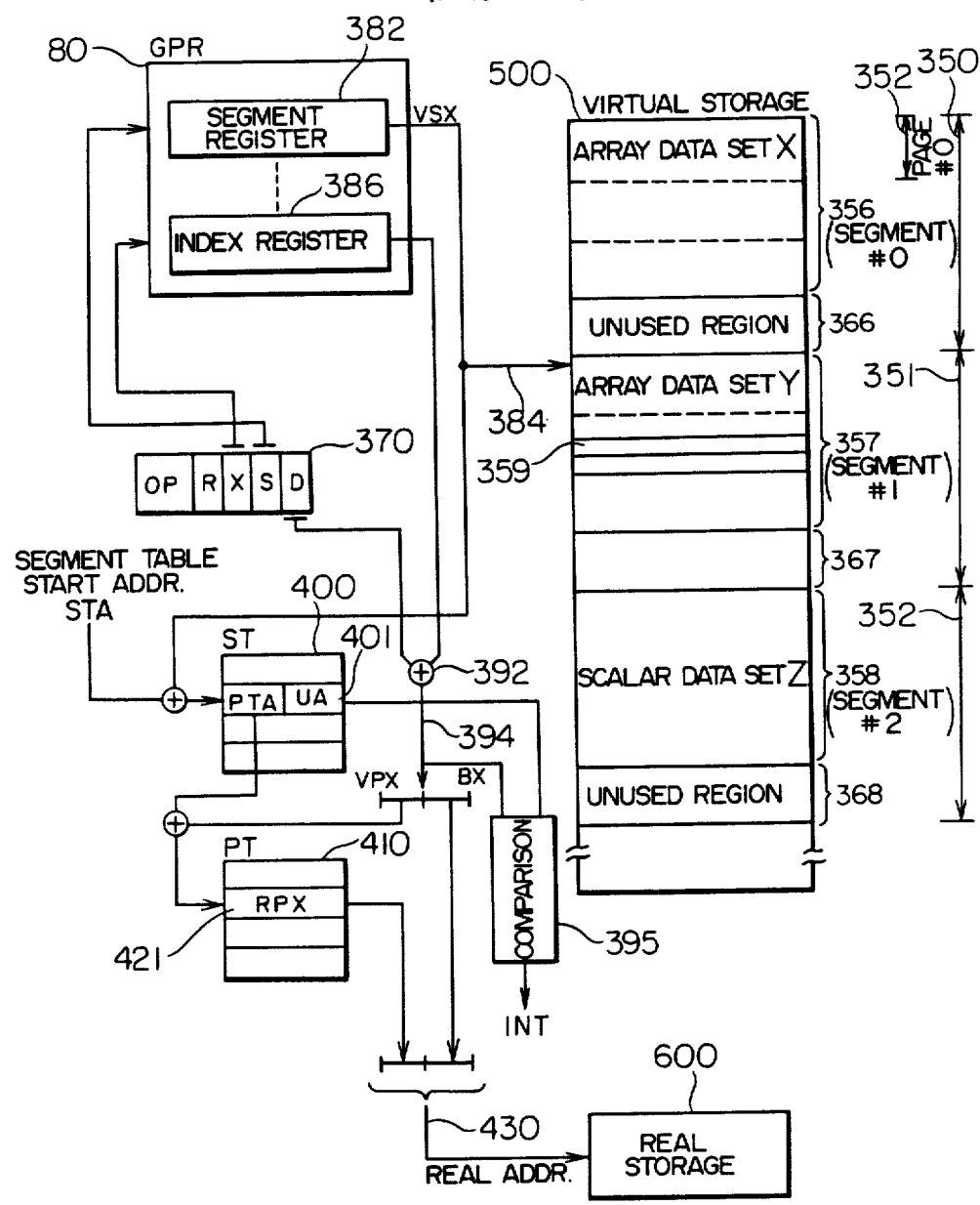
FIG. 5 is a view for illustrating a hitherto known segmentation method.

Next, the segmentation method will be reviewed by referring to FIG. 5. According to the segmentation method, a virtual storage 500 is divided into a number of unit areas 350, 351, 352 and so forth each of a predetermined size as in the case of the demand paging method. However, the former differs from the latter in that one unit area is not allocated to a plurality of data sets. By way of example, areas 356, 357 and 358 for the array data sets X and Y and the scalar data set Z are individually provided in the unit areas 350, 351 and 352, respectively. Further, each of the data areas 356, 357 and 358 starts with the start address field of each unit area, wherein the remnant areas 366, 367 and 368 of the unit areas 350, 351 and 352 remain unused. Parenthetically, in the case of the segmentation method, the areas allocated to the data sets are referred to as the segments each having a size which can be determined by the user through corresponding programming, wherein each of the unit areas 350 etc. is divided into a plurality of page regions 352 each of a predetermined size as in the case of the demand paging method.

With an instruction 370, a segment register number S, an index register number X and displacement D are designated. In the segment register included in a general purpose register group 80, a start address of the segment containing the operand to which access is to be made (e.g. operand 359) is previously placed, as indicated by an arrow 384. The virtual address of the data designated by the instruction 370 is given by the sum determined through addition of the contents of the segment register 382 and the index register 386 and the displacement D contained in the instruction. In reality, translation of the virtual address of the data 359 designated by the instruction 370 into the real address is effectuated with the aid a segment table 400 and a page table 410 as in the case of the demand paging method. However, the segment table 400 differs from the one employed in the demand paging method in that each entry of the segment table 400 includes for each associated segment an upper limit address UA thereof in addition to the address PTA of the page table 410 allocated to the pages belonging to that segment. Upon address translation, the segment index VSX read out from the segment register 382 is added to the start address STA of the segment table for reading the start address of the page table 410 and the upper limit address UA by referring to the entry (e.g. entry 401) of the segment table 400. On the other hand, the content of the page register 386 and the displacement D are added together by an adder 392 for calculating the relative address 394. This relative address is divided into the page index field VPX and the byte index field BX. Subsequently, generation of the real address with the aid of the page table 410 is performed in the manner similar to the demand paging method. The relative address 394 is compared with the limit address UA of the segment through a comparator 395. When the former exceeds the latter, an address translation exception interrupt INT is issued. In this way, in the segmentation method, when the instruction which should access the data of a data set (e.g. the array data set Y) erroneously makes access to the data in the unused area 366, the error check (i.e. address boundary check) can be accomplished with satisfactory effectiveness in the course of the address translation. In that case, however, that portion of the relative address for the segment index which exceeds the size of the segment can not be addressed, being forced to remain unused. Thus, the unused areas denoted by 366, 367 and 368 are produced here and there in the virtual storage 500, incurring degradation in the utilization efficiency of the virtual storage 500. Further, when the segment index VSX of the segment register 382 is in error, that entry of the segment table 400 which is irrelevant to the segment intended to be accessed will be referred to, as a result of which the address boundary check is rendered impossible, to another disadvantage.

Now, the invention will be described in detail in conjunction with an illustrative or exemplary embodiment thereof.

Figure 1:
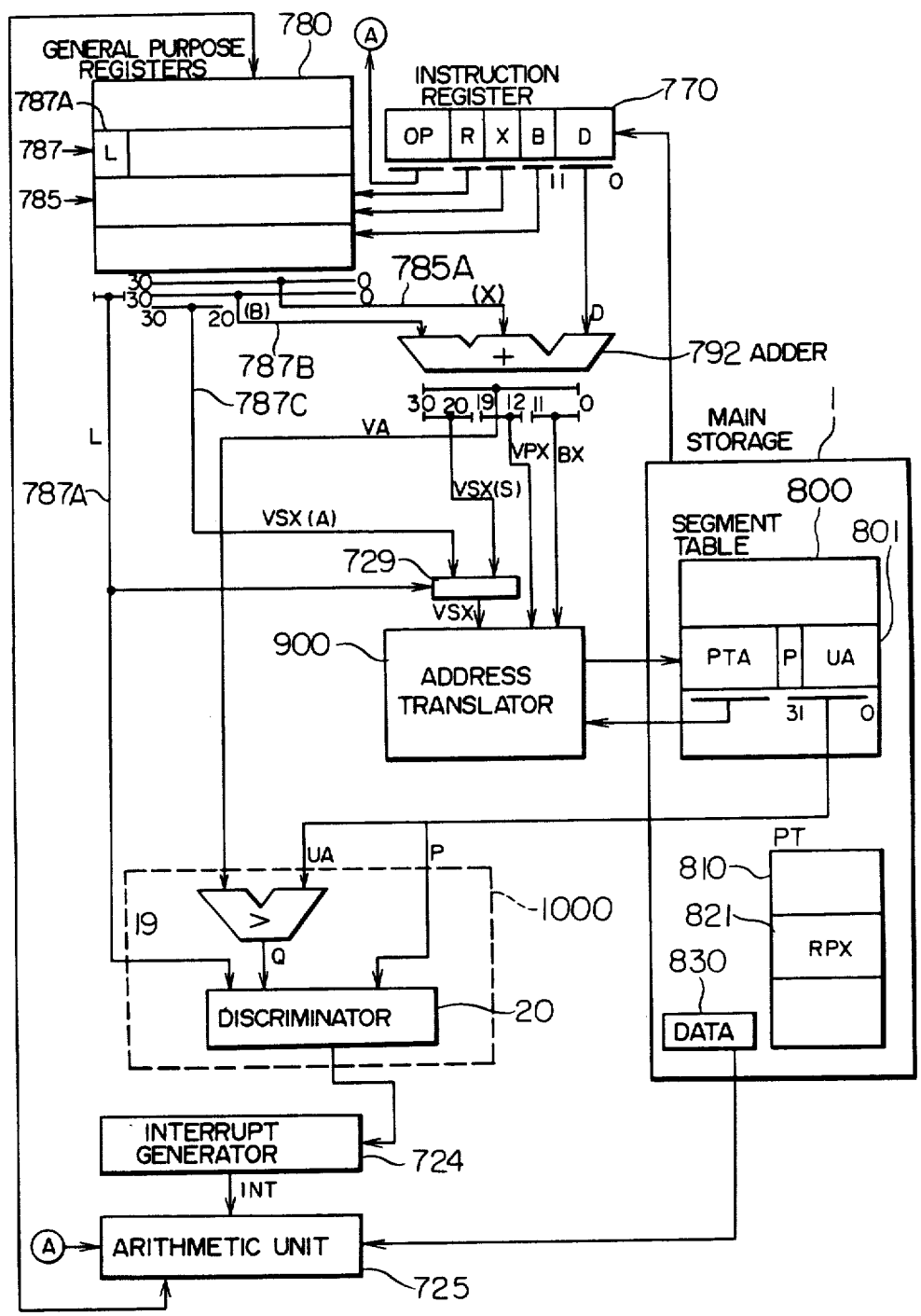
FIG. 1 is a view showing in a block diagram a general arrangement of the data processing apparatus according to an exemplary embodiment of the present invention.

Referring to FIG. 1 which shows a general arrangement of the data processing apparatus according to an embodiment of the present invention, a reference numeral 780 generally denotes a group of general purpose registers, a numeral 770 denotes an instruction register holding an instruction to be executed, 792 denotes an adder for calculating virtual addresses of operands designated by the instruction, 900 denotes an address translation circuit for translating the virtual address into a real address, 725 denotes an arithmetic unit, 1000 denotes an address exception check circuit, and a numeral 724 denotes an interrupt signal generating circuit.

Figure 2:
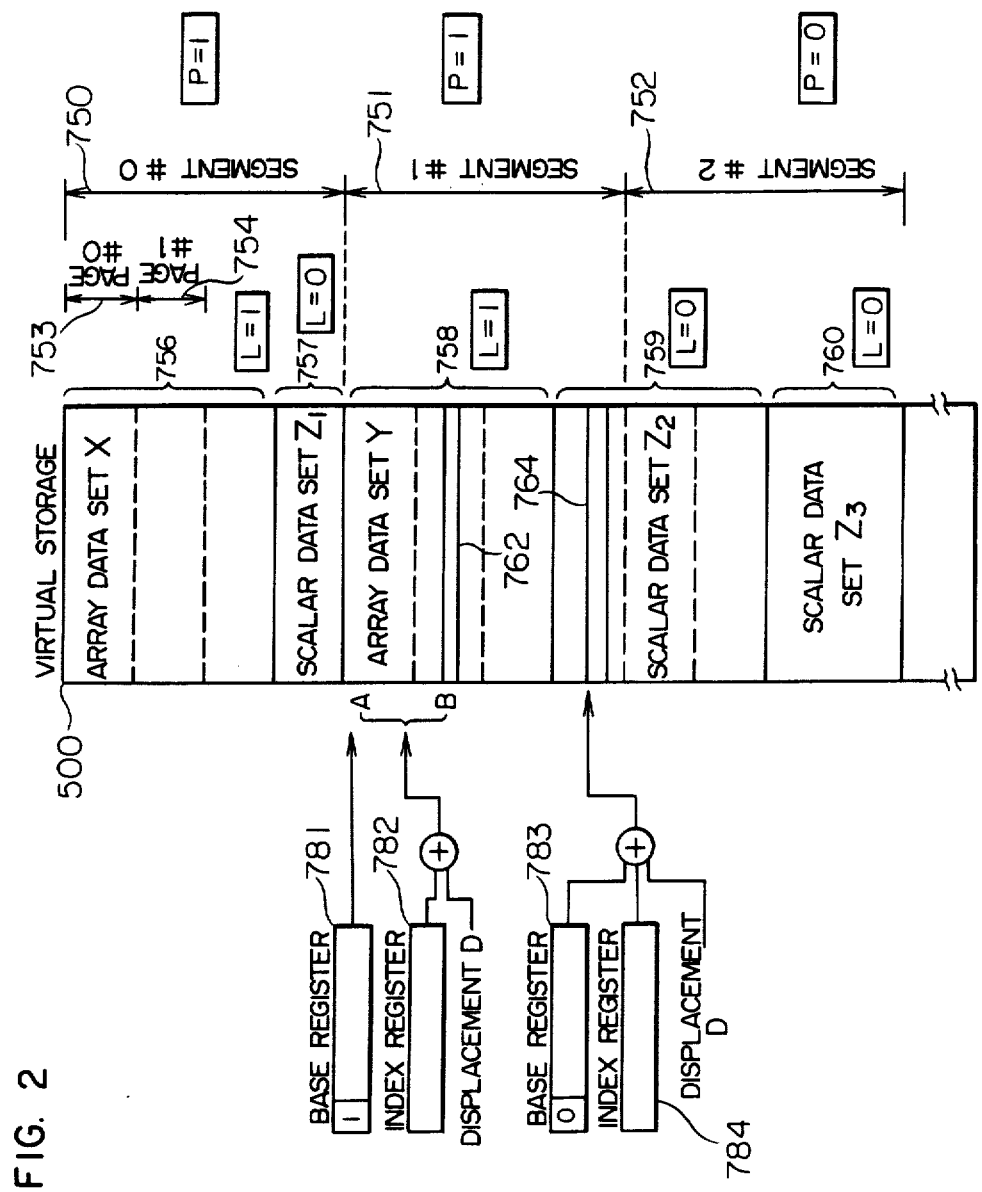
FIG. 2 is a view for illustrating allocation or assignment of a virtual storage in the data processing apparatus shown in FIG. 1.

FIG. 2 illustrates, by way of example, a manner in which a virtual storage 500 is used in the illustrative embodiment of the invention. The virtual storage 500 is divided into areas 750, 751, 752 and so forth each having a fixed length, wherein each area is divided into a plurality of pages 753, 754 and so forth. In the case of the instant embodiment of the invention, these areas 750, 751, 752 and so forth are each referred to as the segment as with the case of the demand paging method.

One of the characteristic features of the invention resides in that a data set which is to undergo an address boundary check is necessarily assigned to an area beginning with the starting part of a certain segment. Further, according to another feature of the invention, the aforementioned region is not allowed to straddle over two segments.

In the illustrative embodiment of the invention, it is assumed that the array data sets X and Y are selected as the examples of data requiring an address boundary check and that areas 756 and 758 beginning with the starting parts of the segments Nos. 0 and 1, respectively, are allocated. The remnant region 757 of the segment No. 1 is allocated to a scalar data set $Z_1$ as the example of data for which the address boundary check is not required. Further, it is assumed that the area 759 including the remnant region of the segment No. 1 and a part of the segment No. 2 is allocated to a scalar data set $Z_2$ which also requires no address boundary check. Finally, the remnant region 760 of the segment No. 2 is allocated to a scalar data set $Z_3$.

With the allocation of the areas or regions described above, it is intended with the present invention to detect if the instruction destined to make access to the data set which is to be checked as to the address boundary such as, for example, the array data set Y erroneously makes access to the scalar data set Z located outside of the area 764, or detect reversely if the instruction which should make access to the scalar data set (e.g. the data set $Z_2$) erroneously tries to make access to the data included in the array data set X or Y.

Turning to FIG. 1, each entry of the segment table 800 referred to in the translation of the virtual address into the real address includes an address PTA of the page table 821 for the pages present in the associated segment, as in the case of the demand paging method. Further, according to another characteristic feature of the illustrative embodiment, a flag P assuming a value "1" or "0" in dependence on the presence or absence of the areas allocated to the data to undergo the address boundary check and the upper limit address UA of that region, if present, are stored in each entry of the associated segment. By way of example, the segment No. 0 shown in FIG. 2 includes the area 756 allocated to the array data X to be checked as to the address boundary. Accordingly, the flag P assumes the value of "1", whereby the upper limit address of the area 756 is set as the address UA in the entry for the segment No. 0 in the segment table 800. Same holds true for the entry of the segment No. 1. On the other hand, the flag P is "0" for the segment No. 3 because of allocation only of the scalar data which requires no address boundary check.

In the case of the illustrative embodiment, the general purpose registers designated by the instruction placed in the instruction register 770 are the same as those used in the hitherto known demand paging illustrated in FIG. 4. In other words, the virtual address of the data to be accessed with the instruction is equal to a value obtained through addition of the displacement D to the contents of the base register and the index register designated by the instruction. However, a difference from the demand paging method can be seen in that a restrictive condition is imposed such that when an instruction makes access to the data to be checked with respect to the address boundary, the start address of the virtual storage area where the data is stored is placed as the base address in the general purpose register (base register) designated by the base register number B contained in that instruction and that the start bit of the base register (hereinafter referred to as L-bit) is set to "1". By way of example, it is assumed that access is to be made to the data area 762 of the array data set Y illustrated in FIG. 2. In this case, the start address A of the area 758 is previously placed in the base register (e.g. 781 in FIG. 2) and the L-bit of that register is set to "1". Accordingly, the content of the index register 782 and the displacement D designated by the instruction at that time have to be so determined that the sum of the content of the index register and the displacement D becomes equal to the relative address representative of the difference between the address B and the aforementioned address A. When access is made to the area 764 of a scalar data set (e.g. $Z_2$) in response to an instruction, the L-bit of the base register (e.g. 783 in FIG. 2) designated by that instruction is set to "0". However, no restriction is imposed on the base address placed in the base register (783). It is only required that the sum of the content of the index register 784 (FIG. 2) and the displacement D designated by that instruction be equal to the virtual address of that region 764.

In the case of the illustrative embodiment shown in FIG. 1, the general purpose register 780 is of 32-bit capacity. However, since the start L-bit of the base register is not used directly in the address calculation, the base address data placed in the base register consists of 31 bits. Correspondingly, the start bit of the index register also is excluded from the address calculation. Accordingly, the relative address data placed in the index register is of 31 bits.

Now, operation of the apparatus shown in FIG. 1 will be described.

With the instruction placed in the instruction register 770 and having the R, X and B fields, the general purpose register group 780 is accessed, whereby the relative address (hereinafter represented by "X") of the index register 785 having the identification number X is read onto a line 785A. The L-bit and the base address (hereinafter represented by "B") of the base register 787 and the most significant 11 bits (hereinafter represented by "VSX(A)") of the base address are read out onto lines 87A, 787B and 787C, respectively. The base address B is added to the data X and the displacement D through the adder 792, whereby the virtual address VA of 31 bits is produced as the output. The most significant 11 bits of this virtual address VA represents the virtual segment index VSX(S) while the intermediate 8 bits thereof represent the virtual page index VPX. Finally, the least significant 12 bits represent the byte index BX. The selector 729 selects either the data VSX(S) or VSX(A) in dependence on whether the L-bit read out from the base register 787 is "1" or "0", to thereby output the selected data as the segment index VSX. When the instruction placed in the instruction register 770 is the one which is to make access to the scalar data, the L-bit is "0". Accordingly, the data VSX(S) is selected by the selector 729.

Figure 3:
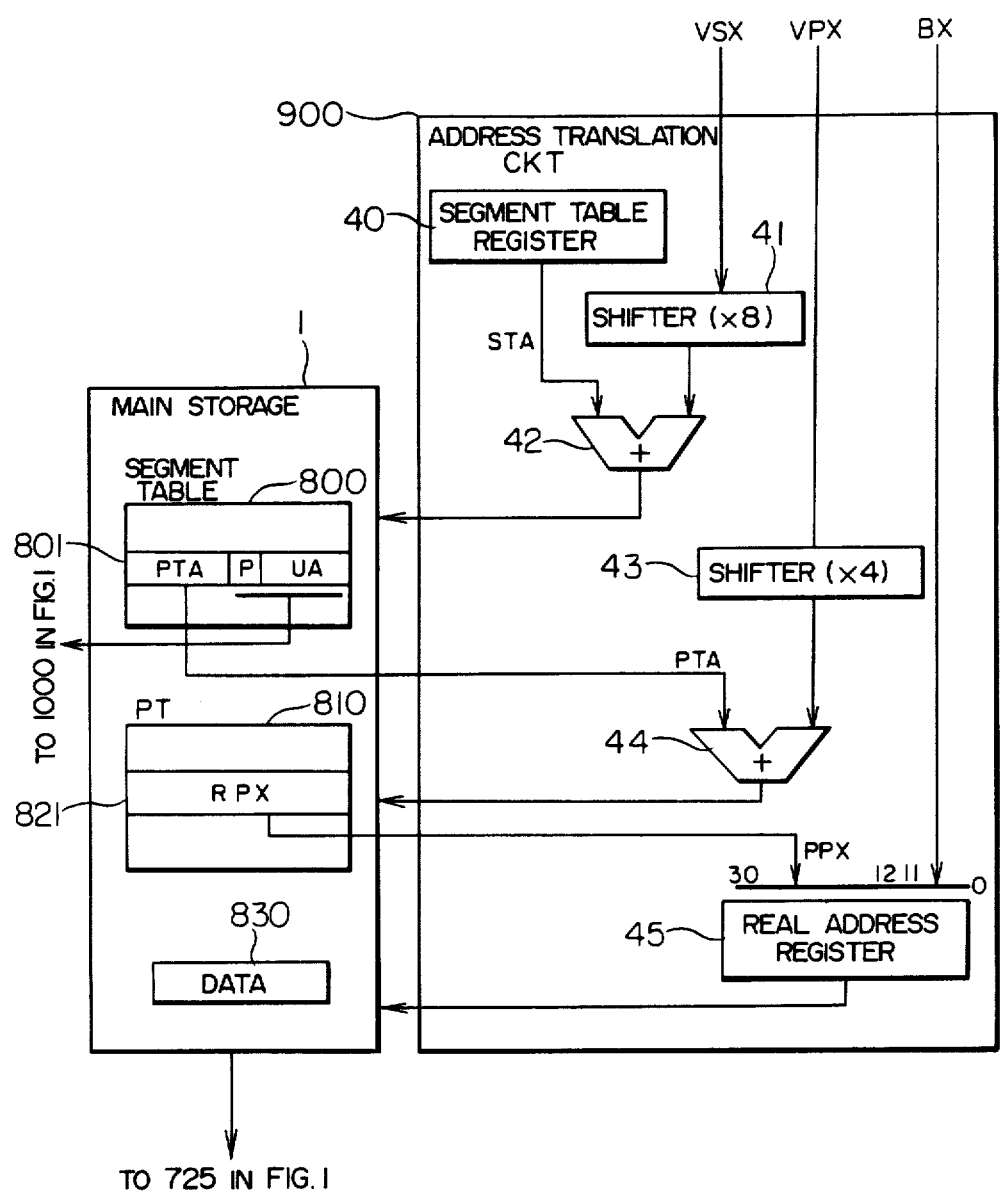
FIG. 3 is a view showing in a schematic block diagram an arrangement of an address translation circuit (900) of the data processing apparatus shown in FIG. 1.

The address translating operation performed by the address translation circuit 900 is the same as in the case of the conventional demand paging method. More specifically, referring to FIG. 3, in the address translation circuit 900, a shifter 41 multiplies the input segment index VSX by a factor of 8, while an adder 42 adds together the segment table address STA placed in the segment table register 40 and the output of the shifter 41 to generate the address of the entry (e.g. 801) contained in the segment table 800 for the segment to which the virtual address VA belongs, and the entry 801 is read out. The page table address PTA contained in the entry 801 is supplied to an adder 44 of the address translation circuit 900. On the other hand, the P-bit and the upper limit (maximum) bit VA contained in the entry are supplied to the address boundary check circuit 1000 (FIG. 1). A shifter 43 multiplies the page index VPX by a factor of 4, while an adder 44 adds the page table address PTA read out from the aforementioned segment table entry 801 to the output of the shifter 43 to determine the address of the entry (e.g. 821) in the page table 810. Subsequently, the page index RPX read out from the page table entry 821 is set at the most significant 19 bits of the real address register 45, while the input byte index BX is set at the least significant 12 bits of a real address register 45. With this address, access is made to the main storage 1, whereby data 830 are read out to the operational or arithmetic unit 725. The address translating operation described so far is same as in the case of the demand paging method. In the illustrative embodiment, however, the address boundary checking operation is additionally performed in the manner described below.

Referring to FIG. 1, the virtual address VA outputted by the adder 792 is compared through the comparator 19 with the limit address UA previously read out from the segment table 800 by means of the address translation circuit 900. When the former (VA) is greater than the latter (UA), the comparator 19 produces the output Q of "1". A discriminator circuit 20 serves to activate the interrupt generating circuit 724 when combination of L-bit on the line 787A, P-bit read out previously from the segment table 800 and the output Q of the comparator 19 is (1, 1, 1) or (0, 1, 0) or when a combination of L and P is (1, 0). Upon activation, the interrupt generating circuit 724 supplies an interrupt signal INT to the arithmetic unit 725 over an interrupt signal line, indicating that the virtual address designated by the instruction to be executed is in error.

When the instruction under execution is one which should make access to the data of the scalar data set $Z_2$, as assumed in the foregoing description of the operation, the bit L is equal to "0" so far as the L-bit placed in the base register 787 designated by the instruction is correct. In case the data to which the instruction should make access is data 764 stored in the segment No. 1 as shown in FIG. 2, the entry 801 in the segment table 800 read out by the address translation circuit 900 on the basis of the calculated virtual address in response to the instruction is destined for the segment No. 1 so far as the base address (B) and the relative address (X) of the base address register 787 and the index register 785 designated by the instruction as well as the displacement D also designated by the same instruction are all correct. Since the segment No. 1 contains the array data set Y to be checked in respect to the address boundary, P="1" is valid for the entry 801, and the limit address UX is the largest address of the area 758. Accordingly when the instruction mentioned above is normal, Q="1" holds true, because the virtual address VA is greater than the limit address. Consequently, the output of the discriminator circuit 20 remains "0", because L="0", P="1" and Q="1". However, when the virtual address VA is smaller than the limit address UA because of error either in the base address (B) or the relative address (X) or the displacement D, the output of the discriminator circuit 20 is "1". In this way, the address boundary check is carried out.

A similar address boundary check is also performed when the virtual address VA for an instruction which should make access to the data of the scalar data set $Z_2$ is the address in the area 756 of the segment No. 0 allocated to the array data set X. In this case, the entry read out from the segment table 800 by the address translation circuit 900 is destined for the segment No. 0. Accordingly, P="1", and the limit address UA represents the largest address in the area 756. Consequently, the output Q of the comparator 19 is "1".

As will be appreciated from the above description, the address boundary check can be carried out when an instruction which should make access to the scalar data designates erroneously a virtual address for the data of the array data set, so far as the L-bit in the base register designated by the instruction is "0".

In this connection, it is noted that when an instruction designates erroneously a virtual address of scalar data differing from the one which should naturally be designated by that instruction, this error can not be checked. By way of example, it is assumed that an instruction which should inherently make access to the scalar data in the area 764 of the segment No. 1 designates erroneously the scalar data in the area 757 of the segment No. 0. Then, L="0", P="1" and Q="1". Thus, the output of the discriminator circuit 20 remains "0".

Further, when an instruction which should inherently make access to the scalar data set $Z_3$ in the segment No. 2 accesses erroneously the data in a corresponding segment of the scalar data set $Z_2$, P="0" is valid for that segment. Consequently, no address boundary check is performed.

Turning to FIG. 1, further description will be made of the operation of the data processing apparatus on the assumption that an instruction to be executed is one which should access the data to be checked in respect to the address boundary, e.g. data contained in the array data set Y.

When the instruction is normal the L-bit of the base register 787 designated by the instruction is "1", and the base address (B) in that register indicates the start address of the segment No. 1. The virtual address VA for this instruction can be calculated by means of the adder 792 in the manner described hereinbefore. The selector 729 responds to the L-bit of "1" to select the virtual segment index VSX(A) which is composed of data at the twentieth to thirtieth bits of the base register designated by the instruction mentioned above. This index must coincide with the virtual segment index VSX(S) composed of the twentieth to thirtieth bits of the virtual address outputted from the adder 792, unless the relative address (B) in the index register 785 and the displacement D designated by the above instruction are erroneous. However, in the case of the illustrative embodiment, the segment index VSX(A) derived from the base address (B) is made use of for the instruction which makes access to the array data set (i.e. when L="1") in consideration of the fact that the relative address (B) and/or displacement D may suffer error. The address translating operation is performed in the manner described hereinbefore by using the output VSX of the selector 729 and the outputs VPX and BX of the adder 792. So long as the segment index VSX(A) is correct, the entry 801 read out from the segment table 800 is destined for the segment No. 1. Accordingly, it is valid that P="1". Further, the limit address UA is the largest address in the area 758. Thus, when the virtual address UA outputted from the adder 792 is smaller than the limit address UA, then L="1", P="1" and Q="0". Consequently, the output of the discriminator circuit 20 remains "0". On the other hand, when the virtual address VA erroneously exceeds the limit address and enters the area 759 for the scalar data set $Z_2$, then L="1", P="1" and Q="1". Consequently, the output of the discriminator circuit 20 is "1", allowing the address boundary check to be performed.

As will now be understood, the address boundary check of the instruction which is to access the data included in the array data set can be effectuated, so long as the L-bit and the base address (B) in the base register designated by the instruction are correct. It should be mentioned that when the virtual address designated by an instruction belongs to the segment differing from the one which is inherently destined for that instruction (e.g. the segment No. 1) because of error in the base address (B) notwithstanding L being "1", the entry read out from the segment table 800 is for the erroneous segment. In that case, if the segment under consideration is the one for the array data set (e.g. segment No. 0), then L="1" and P="1", which means that the error can not be checked. However, if the segment in question is for the one destined only for the scalar data set, then L="1" and P="0". This means that the error can be detected by the discriminator circuit 20.

It goes without saying that the address boundary check can not be correctly carried out when the L-bit in the base register designated by the instruction has an erroneous value, as will be appreciated from the foregoing description.

Figure 6:
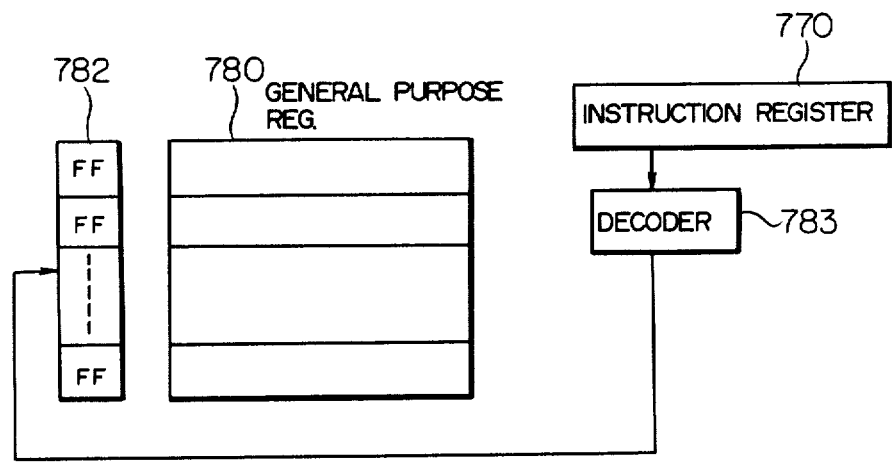
FIG. 6 is a view showing another arrangement of a general purpose register circuitry in the apparatus shown in FIG. 1.

In the course of the above description of the illustrative embodiment, it has been assumed that the start bit of the general purpose register used as the base register in the group of general purpose registers generally denoted by 780 is used as the L-bit. However, the present invention is never restricted to such configuration. As will be seen in FIG. 6, it is possible to provide a plurality of flip-flops 782 in one-to-one correspondence with the individual general purpose registers of the group 780, wherein a flip-flop set or reset instruction placed in the instruction register 770 and designating one of the flip-flops is decoded by a decoder 783 for setting or resetting the one flip-flop.

As will now be appreciated, according to the invention, detection can be made as to whether an instruction which should make access to the data to be checked in respect to the address boundary erroneously makes access to the data requiring no address check or vice versa in the case where a same segment is allocated to both data. Thus, the effective utilization of the virtual storage and the data protection can be accomplished.

In the foregoing, the invention has been described in conjunction with the illustrative or exemplary embodiment. It should however be understood that many modifications and variations may readily occur to those skilled in the art without departing from the spirit and scope of the invention which is set forth in claims.

We claim:

1. A data processing apparatus, comprising:

an address translation table for holding address translation data for use in translating virtual addresses of a virtual storage into real addresses of a real storage, said virtual storage being divided into a plurality of unit areas, said table including first fields and second fields, said first fields each being assigned to a respective one of said unit areas and each first field holding an area discriminating field having a first or second value depending upon whether or not a partial area within the respective unit area is assigned for storing data which requires an address boundary check of a virtual address provided for access thereto, and said second fields each being assigned to a respective one of said unit areas and each second field holding a limit address indicative of a range of the partial area within the respective unit area, when the partial area is assigned for storing data which requires an address boundary check of a virtual address provided for access thereto;

a plurality of registers including first registers for holding virtual base addresses and second registers for holding virtual relative addresses;

signal hold means provided in association with said first registers for holding register discriminating signals each having a third or fourth value depending upon whether or not a virtual base address held by an associated one of said first registers is to be used to generate a virtual address for data which requires an address boundary check of a virtual address; operation means connected to said registers for reading out a virtual base address and a virtual relative address from first and second registers designated by an instruction and for calculating a virtual address by adding together the virtual base address and the virtual relative address respectively read out from said first and second registers;

selecting means connected to said signal hold means and said operation means for selecting a predetermined more significant bit portion of said read out virtual base address or a predetermined more significant bit portion of said calculated virtual address, depending upon whether or not the register discriminating signal held by said signal hold means for the first register takes the third or fourth value, the predetermined more significant bit portion of the virtual base address or of the calculated virtual address indicating to which one of the unit areas the virtual base address or the calculated virtual address belongs;

address translation means connected to said operation means and said selecting means for obtaining a real address corresponding to a second virtual address composed of said selected more significant bit portion and a less significant bit portion of said calculated virtual address based upon the address translation data of said address translation table and for reading out from the address translation table an area discriminating signal and a limit address signal for the unit area corresponding to said selected predetermined more significant bit portion; and address boundary check means connected to said signal hold means, said operation means and said address translation means for outputting a signal indicating that said calculated virtual address is erroneous, (1) when said register discriminating signal for said first register assumes said third value, said area discriminating signal as read out assumes said first value and said calculated virtual address is located outside of a range indicated by said limit address signal as read out, or (2) when said register discriminating signal for said first register assumes said fourth value, said area discriminating signal as read out assumes said first value and said calculated virtual address is located inside of the range indicated by said limit address signal as read out.

2. A data processing apparatus according to claim 1, wherein a virtual base address to be used to generate a virtual address for data which requires an address boundary check indicates a start address of a unit area to which a partial area allocated to said data belongs, while said limit address signal indicates the largest address of the partial area allocated to said data.

3. A data processing apparatus according to claim 1, wherein said address boundary check means includes means for producing a signal indicating that said calculated virtual address is erroneous when the register discriminating signal for said first register assumes said third value and said area discriminating signal as read out assumes said second value.

4. A data processing apparatus according to claim 1, wherein said signal hold means is composed of one-bit storage areas each provided within a respective one of said plural registers.

5. A data processing apparatus according to claim 1, wherein said signal hold means is composed of a plurality of flip-flops each provided in correspondence to one of said plural registers, respectively.

6. A data processing apparatus, comprising:
an address translation table for holding address translation data for use in translating virtual addresses of a virtual storage into real addresses of a real storage, said virtual storage being divided into a plurality of unit areas, said table holding limit address fields each assigned to a respective one of the unit areas and each holding an address signal which is indicative of a range of partial area within the corresponding unit area when the partial area is assigned for storing data which requires an address boundary check of a virtual address provided for access thereto;
a plurality of registers including first registers for holding virtual base address and second registers for holding virtual relative addresses;
signal hold means provided in association with said first registers for holding register discriminating signals each having a third or fourth value depending upon whether or not a virtual base address held by an associated one of said first registers is to be used to generate a virtual address for data which requires an address boundary check of a virtual address;
operation means connected to said registers for read out a virtual base address and a virtual relative address from first and second registers designated by an instruction and for calculating a virtual address by adding together the virtual base address and the virtual relative address respectively read out from said first and second registers;
selecting means connected to said signal hold means and said operation means for selecting a predetermined more significant bit portion of said read out virtual base address or a predetermined more significant bit portion of said calculated virtual address, depending upon whether or not the register discriminating signal held by said signal hold means for the first register takes the third or fourth value, the predetermined more significant bit portion of the virtual base address or of the calculated virtual address indicating to which one of the unit areas the virtual base address or the calculated virtual address belongs;
address translation means connected to said operation means and said selecting means for obtaining a real address corresponding to a second virtual address composed of said selected more significant bit portion and a less significant bit portion of said calculated virtual address based upon the address translation data of said address translation table and for reading out a limit address signal from the limit address field of the address translation table for the unit area corresponding to said selected predetermined more significant bit portion; and
address boundary check means connected to said signal hold means, said operation means and said address translation means for outputting a signal indicating that said calculated virtual address is erroneous, (1) when said register discriminating signal for said first register assumes said third value, said limit address signal as read out indicates a valid limit address and said calculated virtual address is located outside of a range indicated by said limit address signal as read out, or (2) when said register discriminating signal for said first register assumes said fourth value, said limit address signal as read out indicates a valid limit address and said calculated virtual address is located inside of the range indicated by said limit address signal as read out.

7. A data processing apparatus according to claim 6, wherein a virtual base address to be used to generate a virtual address for data which requires an address boundary check indicates a start address of a unit area to which a partial area allocated to said data belongs, while said limit address indicates the largest address of the partial area allocated to said data.

8. A data processing apparatus according to claim 6, wherein said address boundary check means includes means for producing a signal indicating that said calculated virtual address is erroneous when the register discriminating signal for said first register assumes said third value and when said address signal as read out from the limit address field does not indicate a valid limit address.

9. A data processing apparatus according to claim 6, wherein said signal hold means is composed of one-bit storage areas each provided within a respective one of said plural registers.

10. A data processing apparatus according to claim 6, wherein said signal hold means is composed of a plurality of flip-flops each provided in correspondence to one of said plural registers, respectively.

11. A method of effecting a virtual address boundary check in a data processing apparatus having an address translation table for holding address translation data for use in translating virtual addresses of a virtual storage into real addresses of a real storage, said virtual storage being divided into a plurality of unit areas, a plurality of registers including first registers for holding virtual base address and second registers for holding virtual relative addresses, calculating means connected to said registers for calculating a virtual address by adding together a virtual base address and a virtual relative address respectively read out from first and second registers both designated by an instruction, and address translation means connected to said calculating means for obtaining a real address, the method comprising the steps of:

- storing in said address translation table first and second fields, said first fields each being assigned to a respective one of the unit areas and each holding an area discriminating field having a first or second value depending upon whether or not a partial area within the respective unit area is assigned for storing data which requires an address boundary check of a virtual address provided for access thereto, and said second fields each being assigned to a respective one of the unit areas and each holding a limit address indicative of a range of the partial area within the respective unit area, when the partial area is assigned for storing data which requires an address boundary check of a virtual address provided for access thereto;
- storing register discriminating signals each having a third or fourth value depending upon whether or not a virtual base address held by a respective one of said plurality of registers is to be used to generate a virtual address for data which requires an address boundary check of a virtual address;
- selecting a more significant bit portion of a virtual base address read out of a first register designated by said instruction or a more significant bit portion of a virtual address calculated by said calculating means, depending upon whether or not the register discriminating signal for said first register takes the third or fourth value and for applying said selected more significant bit portion to said address translation means as an indication of the unit area to which the selected virtual base address or the calculated virtual address belongs;
- reading out from the address translation table an area discriminating signal and a limit address signal for the unit area indicated by the selected more significant bit portion; and
- outputting a signal indicating that said calculated virtual address is erroneous, when said register discriminating signal for said first register assumes said third value, said area discriminating signal as read out assumes said first value and said calculated virtual address is located outside of a range indicated by said limit address signal as read out, or when said register discriminating signal for said first register assumes said fourth value, said area discriminating signal as read out assumes said first value and said calculated virtual address is located inside of the range indicated by said limit address signal as read out.

12. A method according to claim 11, wherein a virtual base address to be used to generate a virtual address for data which requires an address boundary check indicates a start address of a unit area to which a partial area allocated to said data belongs, while said limit address signal indicates the largest address of the partial area allocated to said data.

13. A method according to claim 11, further including producing a signal indicating that said calculated virtual address is erroneous when the register discriminating signal for said first register assumes said third value and said area discriminating signal as read out assumes said second value.

14. A data processing apparatus, comprising:

- an address translation table for holding address translation data for use in translating virtual addresses of a virtual storage into real addresses of a real storage, said virtual storage being divided into a plurality of unit areas, each of said plurality of unit areas having no portion designated for non-storage of data, and at least one unit area having one portion thereof assigned for storing array data and another portion thereof assigned for storing scalar data;
- a plurality of registers each for holding either a virtual base address or a virtual relative address;
- signal means for holding register discriminating signals each having a first or second value depending upon whether or not a virtual base address held by a respective one of said plurality of registers is to be used to generate a virtual address for data which requires access to a unit area having a portion designated for storing array data;
- means connected to said registers for calculating a virtual address by adding together a virtual base address and a virtual relative address respectively read out from first and second registers both designated by an applied instruction;
- selecting means connected to said signal means and said calculating means for selecting a more significant bit portion of said read out virtual base address or a more significant bit portion of said calculated virtual address, depending upon whether or not the register discriminating signal held by said signal means for the first register takes the first or second value, the more significant bit portion of the virtual base address or of the calculated virtual address indicating to which one of the unit areas the virtual base address or the calculated virtual address belongs;
- address translation means connected to said calculating means and said selecting means for obtaining a real address corresponding to a second virtual address composed of said selected more significant bit portion and a less significant bit portion of said calculated virtual address based upon the address translation data of said address translation table.

* * * * *